(12) United States Patent
Chung et al.

(10) Patent No.: US 12,644,077 B2
(45) Date of Patent: Jun. 2, 2026

(54) GLASS COMPOSITION FOR ECO-FRIENDLY DETERGENT AND METHOD FOR PREPARING GLASS POWDER FOR ECO-FRIENDLY DETERGENT USING SAME

(71) Applicant: LG ELECTRONICS INC., Seoul (KR)

(72) Inventors: Jaeyeop Chung, Seoul (KR); Namjin Kim, Seoul (KR); Young Seok Kim, Seoul (KR); Daesung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 543 days.

(21) Appl. No.: 18/267,565

(22) PCT Filed: Nov. 9, 2021

(86) PCT No.: PCT/KR2021/016275
§ 371 (c)(1),
(2) Date: Jun. 15, 2023

(87) PCT Pub. No.: WO2022/131552
PCT Pub. Date: Jun. 23, 2022

(65) Prior Publication Data
US 2024/0052273 A1      Feb. 15, 2024

(30) Foreign Application Priority Data

Dec. 15, 2020     (KR) ........................ 10-2020-0175662

(51) Int. Cl.
*C11D 3/02*          (2006.01)
*C03B 19/10*          (2006.01)
(Continued)

(52) U.S. Cl.
CPC ............ *C11D 7/04* (2013.01); *C03B 19/1005* (2013.01); *C03C 3/064* (2013.01); *C03C 12/00* (2013.01);
(Continued)

(58) Field of Classification Search
CPC ......... C11D 3/02; C11D 3/1213; C11D 3/124; C11D 7/20; C11D 9/16; C11D 11/00;
(Continued)

(56) References Cited

U.S. PATENT DOCUMENTS 5,290,544 A      3/1994  Shimono et al.
6,589,928 B1      7/2003  Lee
(Continued)

FOREIGN PATENT DOCUMENTS

JP        H 06-157026 A      6/1994
JP        H 07-103400 B2      11/1995
(Continued)

OTHER PUBLICATIONS

International Search Report (with English Translation) and Written Opinion dated Mar. 16, 2022 issued in Application No. PCT/KR2021/016275.

*Primary Examiner* — Brian P Mruk
(74) *Attorney, Agent, or Firm* — KED & ASSOCIATES

(57)                    ABSTRACT

The present invention discloses a glass composition for an eco-friendly detergent, and a method for preparing glass powder for an eco-friendly detergent by using same, wherein the glass composition based on borate-based glass containing large amounts of MgO, CaO, $K_2O$, $Na_2O$, and $B_2O_3$ and a trace amount of $SiO_2$ exhibits maximized elution of ions such as $K^+$, $Na^+$, $Ca^{2+}$, $Mg^{2+}$, etc., whereby a high concentration of eluate can be prepared. As a result, the glass composition for an eco-friendly detergent and the method for preparing glass powder for an eco-friendly detergent
(Continued)

allow for the repeated use of a certain amount of glass and can uniformly maintain cleansing performance even to 40 cleansing rounds or more.

20 Claims, 3 Drawing Sheets

(51) Int. Cl.

| | |
|---|---|
| *C03C 3/04* | (2006.01) |
| *C03C 3/062* | (2006.01) |
| *C03C 3/064* | (2006.01) |
| *C03C 3/14* | (2006.01) |
| *C03C 12/00* | (2006.01) |
| *C11D 7/04* | (2006.01) |
| *C11D 7/20* | (2006.01) |
| *C11D 9/16* | (2006.01) |
| *C11D 11/00* | (2006.01) |
| *C11D 13/10* | (2006.01) |
| *C11D 13/12* | (2006.01) |
| *C11D 13/22* | (2006.01) |
| *C11D 17/06* | (2006.01) |

(52) U.S. Cl.
CPC ........... *C11D 17/06* (2013.01); *C11D 2111/12* (2024.01)

(58) Field of Classification Search
CPC ......... C11D 13/10; C11D 13/12; C11D 13/22; C11D 17/06; C03C 3/062; C03C 3/064; C03C 3/04; C03C 3/14; C03C 12/00; C03B 19/10; C03B 19/1005
See application file for complete search history.

(56) References Cited

U.S. PATENT DOCUMENTS

| | | | |
|---|---|---|---|
| 2005/0233888 A1 | 10/2005 | Seneschal et al. | |
| 2006/0142413 A1 | 6/2006 | Zimmer et al. | |
| 2006/0166806 A1 | 7/2006 | Fechner et al. | |
| 2010/0291237 A1* | 11/2010 | Cook ..................... | C03C 3/091 510/508 |

FOREIGN PATENT DOCUMENTS

| | | | | | |
|---|---|---|---|---|---|
| JP | 2005-255517 A | | 9/2005 | | |
| JP | 2006-518696 A | | 8/2006 | | |
| JP | 2006-520311 A | | 9/2006 | | |
| KR | 10-2002-0013592 A | | 2/2002 | | |
| WO | WO-2022131554 A1 * | | 6/2022 | ............... | C11D 7/10 |

* cited by examiner

PRESENT EXAMPLE 4

PRESENT EXAMPLE 7

NUMBER OF REPETITIONS (TIMES)

COMPARATIVE EXAMPLE 1

NUMBER OF REPETITIONS (TIMES)

GLASS COMPOSITION FOR ECO-FRIENDLY DETERGENT AND METHOD FOR PREPARING GLASS POWDER FOR ECO-FRIENDLY DETERGENT USING SAME

CROSS-REFERENCE TO RELATED PATENT APPLICATIONS

This application is a U.S. National Stage Application under 35 U.S.C. § 371 of PCT Application No. PCT/KR2021/016275, filed Nov. 9, 2021, which claims priority to Korean Patent Application No. 10-2020-0175662, filed Dec. 15, 2020, whose entire disclosures are hereby incorporated by reference.

FIELD

The present disclosure relates to a glass composition for an eco-friendly detergent and a method for preparing glass powder for an eco-friendly detergent using the same.

DESCRIPTION OF RELATED ART

In general, a process of removing stains from a fiber or laundry is referred to as laundry, and a process of removing stains from tableware is referred to as washing.

Such laundry and washing refer to removing contaminants by dispersing a surfactant in water and increasing alkalinity of water.

Because a method for performing the laundry and the washing using a synthetic detergent uses a large amount of water, the method has an excellent removal effect on aqueous contaminants, but has limitations in removing oil-based contaminants.

In addition, the existing synthetic detergent uses linear alkylbenzene, an anionic surfactant, a builder, and the like to remove dirty stains adhered to the laundry or the tableware and dry the laundry and the tableware.

However, when the laundry and the wash are performed using the existing synthetic detergent, environmental pollution is caused because of the surfactant not dissolving in water and causing eutrophication.

PRIOR ART LITERATURE

Patent Literature (Patent Document 1) Korean Patent Application Publication No. 10-2001-0089638 (published on Oct. 6, 2001)

DISCLOSURE

Technical Purposes

The present disclosure is to provide a glass composition for an eco-friendly detergent and a method for preparing glass powder for an eco-friendly detergent using the same that present a new laundry solution using elution characteristics of glass with weak water resistance, unlike general glass.

In addition, the present disclosure is to provide a glass composition for an eco-friendly detergent that is borate glass containing large amounts of MgO, CaO, $K_2O$, $Na_2O$, and $B_2O_3$ and a trace amount of $SiO_2$ and enables preparation of high-concentration elution water as elution of ions such as $K^+$, $Na^+$, $Ca^{2+}$, and $Mg^{2+}$ is maximized, and a method for preparing glass powder for an eco-friendly detergent using the same.

In addition, the present disclosure is to provide a glass composition for an eco-friendly detergent and a method for preparing glass powder for an eco-friendly detergent using the same that may repeatedly use a certain amount of glass and may maintain a laundry performance constant even after 40 cycles or more of repeated elution.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

Technical Solutions

The glass composition for the eco-friendly detergent and the method for preparing the glass powder for the eco-friendly detergent using the same may enable the preparation of the high-concentration elution water as the elution of the ions such as $K^+$, $Na^+$, $Ca^{2+}$, and $Mg^{2+}$ is maximized with the borate glass containing large amounts of MgO, CaO, $K_2O$, $Na_2O$, and $B_2O_3$ and a trace amount of $SiO_2$.

As a result, the glass composition for the eco-friendly detergent and the method for preparing the glass powder for the eco-friendly detergent using the same may repeatedly use a certain amount of glass and may maintain the laundry performance constant even after 40 cycles or more of the repeated elution.

That is, the present disclosure has developed the glass composition for the eco-friendly detergent that may uniformly exhibit the laundry performance even after 40 cycles or more of the repeated elution via the ratio adjustment of the alkali components, the alkaline earth components, and $B_2O_3$.

To this end, a glass composition for an eco-friendly detergent according to an embodiment of the present disclosure includes 60 to 85 wt % of $B_2O_3$, 1 to 10 wt % of $SiO_2$, 15 to 30 wt % of a sum of $K_2O$ and $Na_2O$, and 1 to 10 wt % of at least one of CaO and MgO.

In this regard, the $B_2O_3$ is more preferably added in an amount in a range from 65 to 80 wt %.

In addition, the $SiO_2$ is preferably added in an amount in a range from 2 to 9 wt %.

In addition, the $K_2O$, the $Na_2O$, the CaO, and the MgO are added in a range satisfying a following Formula 1.

$$([K_2O]+[Na_2O])/([CaO]+[MgO]) \geq 2 \qquad \text{Formula 1:}$$

Here, [ ] represents a weight ratio of each component.

In addition, the CaO, the MgO, the $K_2O$, the $Na_2O$, the $B_2O_3$, and $SiO_2$ are more preferably added in a range satisfying a following Formula 2.

$$([CaO]+[MgO]+[K_2O]+[Na_2O])/[B_2O_3] \text{ and } [SiO_2]) \geq 0.33 \qquad \text{Formula 2:}$$

Here, [ ] represents a weight ratio of each component.

Technical Effects

According to the present disclosure, the new solution that realizes the excellent washing power equivalent to or greater than that of the commercial detergents.

In addition, according to the present disclosure, because the surfactant is not added, not only the rinsing process may be shortened, but also the water consumption may be reduced during the laundry.

In addition, according to the present disclosure, when the commercial detergent and the elution water are used together, the laundry efficiency may be increased, so that there is the energy saving effect.

In addition, according to the present disclosure, when the borate glass is used as the eco-friendly laundry detergent or the washing supplement and put into the automatic detergent box of the washing machine, the glass may be homogeneously and constantly eluted, so that the recurring period may be extended and the high reliability may be maintained even in the repeated laundry processes.

In addition to the above effects, specific effects of the present disclosure will be described together while describing specific details for carrying out the present disclosure.

DETAILED DESCRIPTIONS

Figure 1:
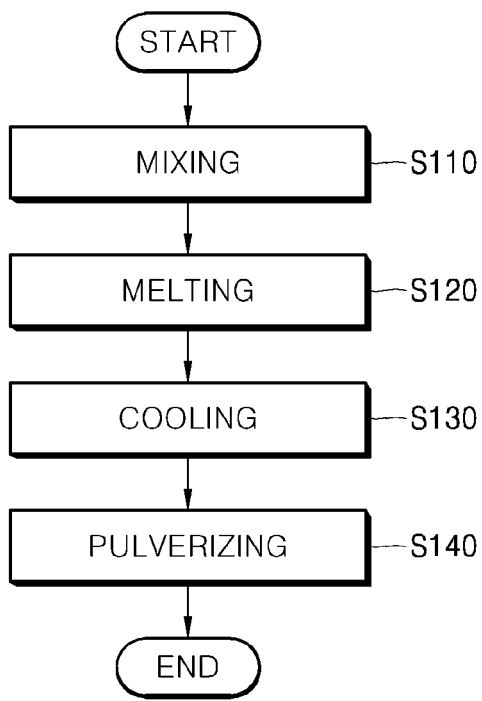
FIG. 1 is a process flowchart showing a method for preparing glass powder for an eco-friendly detergent according to an embodiment of the present disclosure.

The above objects, features, and advantages will be described in detail later with reference to the accompanying drawings. Accordingly, a person having ordinary knowledge in the technical field to which the present disclosure belongs will be able to easily implement the technical idea of the present disclosure. In describing the present disclosure, when it is determined that a detailed description of a known technology related to the present disclosure may unnecessarily obscure the gist of the present disclosure, the detailed description will be omitted. Hereinafter, preferred embodiments according to the present disclosure will be described in detail with reference to the accompanying drawings. In the drawings, the same reference numerals are used to indicate the same or similar components.

As used herein, the singular constitutes "a" and "an" are intended to include the plural constitutes as well, unless the context clearly indicates otherwise. In this application, terms such as "composed of" or "include" should not be construed as necessarily including all of various components or steps described herein, but should be construed that some components or steps among those may not be included or additional components or steps may be further included.

Hereinafter, a glass composition for an eco-friendly detergent and a method for preparing glass powder for an eco-friendly detergent using the same according to some embodiments of the present disclosure will be described.

A glass composition for an eco-friendly detergent according to an embodiment of the present disclosure provides a new laundry solution using elution characteristics of glass with weak water resistance unlike general glass.

That is, the glass composition for the eco-friendly detergent according to the embodiment of the present disclosure is borate glass containing 65 wt % or more of $B_2O_3$, alkali components such as $Na_2O$ and $K_2O$, alkaline earth components such as CaO and MgO, and a trace amount of $SiO_2$.

To have laundry continuity, components in glass must be homogeneously eluted until elution water reaches a saturation concentration, and the glass must be homogeneously soluble in water even after repeated elution. In the present disclosure, a glass composition for an eco-friendly detergent that may uniformly exhibit a laundry performance even after 40 cycles or more of the repeated elution via ratio adjustment of the alkali components, the alkaline earth components, and $B_2O_3$.

In addition, the glass composition for the eco-friendly detergent according to the embodiment of the present disclosure is the borate glass containing large amounts of MgO, CaO, $K_2O$, $Na_2O$, and $B_2O_3$ and a trace amount of $SiO_2$, which enables preparation of high-concentration elution water as elution of ions such as $K^+$, $Na^+$, $Ca^{2+}$, and $Mg^{2+}$ is maximized.

As a result, in the glass composition for the eco-friendly detergent according to the embodiment of the present disclosure, the elution water activated in water may exhibit excellent washing power in various soiled fabrics such as a dye component (red wine)-soiled fabric, a protein component (blood)-soiled fabric, and a composite soiled fabric (Jis fabric), and exhibit high laundry efficiency when used with a laundry detergent. In addition, the elution may be maintained homogeneous and constant via a design of an optimal combination ratio between $B_2O_3$, alkali oxide, and alkaline earth oxide. For this reason, the present disclosure may repeatedly use a certain amount of glass, and may maintain the laundry performance constant even after the 40 cycles or more of the repeated elution.

In general, because the borate glass is a glass composition system having poor water resistance, efforts have been made to improve chemical resistance and the water resistance via changes in a structure and the composition of the glass. However, the borate glass may be used as a laundry detergent or a washing supplement using characteristic of dissolving well in water and eluting various ions. This is because $B_2O_3$, a major component constituting the glass, is eluted in water to form borate ions and contributes to washing of a dye component during laundry. In addition, the alkali oxide and the alkaline earth oxide form $OH^-$ ions when eluted in water, and contribute to washing of proteins and fat-soluble contaminants.

On the other hand, in the borate glass, it is important to control the elution characteristics of the borate glass to maximize utility as the laundry detergent and the washing supplement. First of all, this is because the elution of the borate glass must be maximized to make the laundry possible even with a short elution duration. In addition, when a portion of the elution water is used after the elution at a saturation concentration level once and then a portion of tap water is added thereto, the glass must be eluted continuously and homogeneously to ensure reliability during repeated use.

To control the elution characteristics of such borate glass, the combination ratio of the alkali oxide, the alkaline earth oxide, and $B_2O_3$ is very important. In addition, a trace amount of $SiO_2$ should be added to increase a vitrification ability of the glass.

To this end, the glass composition for the eco-friendly detergent according to the embodiment of the present disclosure contains 60 to 85 wt % of $B_2O_3$, 1 to 10 wt % of $SiO_2$, 15 to 30 wt % of a sum of $K_2O$ and $Na_2O$, and 1 to 10 wt % of at least one of CaO and MgO.

In this regard, $B_2O_3$ is more preferably added in an amount in a range from 65 to 80 wt %.

In addition, $SiO_2$ is preferably added in an amount in a range from 2 to 9 wt %.

In addition, $K_2O$, $Na_2O$, CaO, and MgO are added in a range satisfying Formula 1 below.

$$([K_2O]+[Na_2O])/([CaO]+[MgO]) \geq 2 \qquad \text{Formula 1:}$$

Here, [ ] represents a weight ratio of each component.

In addition, it is more preferable that CaO, MgO, $K_2O$, $Na_2O$, $B_2O_3$, and $SiO_2$ are added in a range satisfying a Formula 2 below.

$$([CaO]+[MgO]+[K_2O]+[Na_2O])/[B_2O_3] \text{ and } [SiO_2]) \geq 0.33 \qquad \text{Formula 2:}$$

Here, [ ] represents a weight ratio of each component.

Therefore, when the glass composition for the eco-friendly detergent according to the embodiment of the present disclosure is used as the eco-friendly detergent, a new solution that realizes the excellent washing power equivalent to or greater than that of the commercial detergents may be presented.

In addition, when the glass composition for the eco-friendly detergent according to the embodiment of the present disclosure is used as the eco-friendly detergent, because a surfactant is not added thereto, not only a rinsing process may be shortened, but also a water consumption during laundry may be reduced.

In addition, when the glass composition for the eco-friendly detergent according to the embodiment of the present disclosure is used as the eco-friendly detergent, a laundry efficiency may be increased when the glass composition is used together with the commercial detergent and the elution water, so that there is an energy saving effect.

In addition, in the present disclosure, when the borate glass is used as the eco-friendly laundry detergent or the washing supplement and put into an automatic detergent box of a washing machine, the glass may be homogeneously and constantly eluted, so that a recurring period may be extended and high reliability may be maintained even in the repeated laundry processes.

Hereinafter, a role and a content of each component of the glass composition for the eco-friendly detergent according to the embodiment of the present disclosure will be described in detail.

$B_2O_3$, as a glass former that is representatively used together with $SiO_2$, $P_2O_5$, and the like, is a key component that enables sufficient vitrification and forms a core framework within a structure of the glass. $B_2O_3$ primarily exists in a form of $BO_3$ and $BO_4$, with tricoordinated and tetracoordinated structures, respectively, within the glass, and also plays a role in lowering a melting temperature of the glass.

Compared to $SiO_2$-based glass, the glass containing a large amount of $B_2O_3$ is vulnerable to water, maximizing the elution of the glass. In addition, $B_2O_3$ has a bleaching effect during the elution and serves as a pH buffer, and thus, does not cause discoloration by the dye contaminants.

Therefore, $B_2O_3$ is preferably added in a content ratio in a range from 60 to 85 wt % of a total weight of the glass composition for the eco-friendly detergent according to the present disclosure, and a range from 65 to 80 wt % may be presented as a more preferable range. When the amount of $B_2O_3$ added is smaller than 60 wt %, the bleaching effect may not be exhibited properly, which makes it difficult to secure the washing power. Conversely, when the amount of $B_2O_3$ added exceeds 85 wt %, a decrease in the water resistance may occur because of a nature of the elements resulted from structural problems of B and P in a network-forming structure.

$SiO_2$, the most representative glass former oxide, increases the vitrification, so that it is required to add $SiO_2$ in a trace amount. When $SiO_2$ is added in a large amount, it increases the water resistance of the glass to control the elution. In addition, $SiO_2$ increases the melting temperature of the glass.

Therefore, $SiO_2$ is preferably added in a content ratio in a range from 1 to 10 wt % of the total weight of the glass composition for the eco-friendly detergent according to the present disclosure, and a range from 2 to 9 wt % may be presented as a more preferred range. When a large amount of $SiO_2$ is added in excess of 10 wt %, as viscosity increases during the glass melting, workability and yield decrease during a cooling process. Conversely, when $SiO_2$ is added in an amount smaller than 1 wt %, a structure of the glass is weakened and thus the water resistance is deteriorated.

$Na_2O$ and $K_2O$ are the alkali oxides, which act as network modifiers performing non-bridging bond in the glass composition. The vitrification is impossible with $Na_2O$ and $K_2O$ alone, but the vitrification becomes possible when such components are mixed with the glass former such as $SiO_2$, $B_2O_3$, $P_2O_5$, $V_2O_5$, $Ga_2O_3$, and the like in a certain ratio.

The alkali ions are ion-exchanged with $H_3O^+$ to elute into water and form the $OH^-$ ions, so that the alkali ions are a major component in exerting the washing power. However, when the alkali components are contained in a large amount, a concentration of the $OH^-$ ions increases, and thus, pH increases to a level equal to or higher than 10 to 11, which causes the discoloration by the dye component.

Therefore, because the elution characteristics of the glass vary greatly depending on the content ratios of the alkali oxide and $B_2O_3$, controlling the content ratios is a key of the present disclosure. In the present disclosure, a glass composition that has excellent initial elution characteristics and elutes well even when being continuously used is experimentally confirmed. As a result, in the present disclosure, it is confirmed that, when the alkali oxide is added in the glass in the content in a range from 10 to 30 wt %, characteristics are excellent.

Therefore, the sum of $Na_2O$ and $K_2O$ is preferably added in the content ratio in the range from 15 to 30 wt % of the total weight of the glass composition for the eco-friendly detergent according to the present disclosure. When the sum of $Na_2O$ and $K_2O$ is added in an amount smaller than 15 wt %, it may be difficult to secure washing continuity. Conversely, when the sum of $Na_2O$ and $K_2O$ exceeds 30 wt %, the discoloration by the dye component may be caused resulted from an increase in the concentration of the $OH^-$ ions.

The alkaline earth oxides such as CaO and MgO basically act as the network modifiers that form the non-bridging bonds in the same manner as the alkali oxides in the glass. Therefore, the alkaline earth oxides such as CaO and MgO serve to weaken the glass structure. However, because a degree of weakening the glass structure is low compared to that of the alkali ions, when the alkaline earth oxides are added to the borate glass, the water resistance may rather increase slightly.

Only when an elution rate of the alkali ions is similar to that of boron (B) ions, the constant elution is possible and continuous use as the detergent and the laundry supplement is possible. In this regard, the alkaline earth oxides are added to control and regulate the elution rate of the ions. In addition, like the alkali oxide, the alkaline earth oxide is eluted in water to form the OH⁻ ions, which is helpful for the laundry.

Therefore, at least one of CaO and MgO is preferably added in a content ratio from 1 to 10 wt % of the total weight of the glass composition for the eco-friendly laundry according to the present disclosure. When at least one of CaO and MgO is added in an amount smaller than 1 wt %, the water resistance decrease phenomenon that is not able to prevent the alkali elution may occur. Conversely, it was experimentally confirmed that, when at least one of CaO and MgO is added in excess of 10 wt %, the power for washing the dye component is reduced.

In one example, in the glass composition for the eco-friendly detergent according to the embodiment of the present disclosure, $K_2O$, $Na_2O$, CaO, and MgO are added in a range satisfying Formula 1 below.

$$([K_2O]+[Na_2O])/([CaO]+[MgO])\geq2 \qquad \text{Formula 1:}$$

Here, [ ] represents a weight ratio of each component.

In this regard, the reason for adding $K_2O$, $Na_2O$, CaO, and MgO in the range satisfying Formula 1 is to balance the structural reinforcement resulted from the alkaline earth oxide and the elution of the alkali oxide.

In addition, it is more preferable that CaO, MgO, $K_2O$, $Na_2O$, $B_2O_3$, and $SiO_2$ are added in a range satisfying a Formula 2 below.

$$([CaO]+[MgO]+[K_2O]+[Na_2O])/[B_2O_3] \text{ and } [SiO_2])$$
$$\geq0.33 \qquad \text{Formula 2:}$$

Here, [ ] represents a weight ratio of each component.

In this regard, the reason for adding CaO, MgO, $K_2O$, $Na_2O$, $B_2O_3$, and $SiO_2$ in the range satisfying Formula 2 is to increase the contents of the alkali oxide and the alkaline earth oxide, which are the network modifiers, to increase a degree of ionic bonding in the glass and increase the elution.

Hereinafter, a method for preparing glass powder for an eco-friendly detergent according to an embodiment of the present disclosure will be described with reference to the accompanying drawing.

FIG. 1 is a process flowchart showing a method for preparing glass powder for an eco-friendly detergent according to an embodiment of the present disclosure.

As shown in FIG. 1, the method for preparing the glass powder for the eco-friendly detergent according to the embodiment of the present disclosure includes a mixing (S110), a melting (S120), a cooling (S130), and a pulverizing (S140).

Mixing

In the mixing (S110), 60 to 85 wt % of $B_2O_3$, 1 to 10 wt % of $SiO_2$, and 10 to 30 wt % of the sum of $Na_2O$ and $K_2O$, and 1 to 10 wt % of at least one of CaO and MgO are mixed with each other and stirred to form a glass composition.

In this regard, $B_2O_3$ is preferably added in an amount in a range from 65 to 80 wt %, and $SiO_2$ is preferably added in an amount in a range from 2 to 9 wt %.

In addition, it is preferable that $K_2O$, $Na_2O$, CaO, and MgO are added in an amount range satisfying Formula 1 below.

$$([K_2O]+[Na_2O])/([CaO]+[MgO])\geq2 \qquad \text{Formula 1:}$$

Here, [ ] represents a weight ratio of each component.

It is more preferable that CaO, MgO, $K_2O$, $Na_2O$, $B_2O_3$, and $SiO_2$ are added in an amount range satisfying Formula 2 below.

$$([CaO]+[MgO]+[K_2O]+[Na_2O])/[B_2O_3] \text{ and } [SiO_2])$$
$$\geq0.33 \qquad \text{Formula 2:}$$

Here, [ ] represents a weight ratio of each component.

Melting

In the melting (S120), the glass composition is melted.

In the present step, the melting is preferably performed at a temperature in a range from 700 to 1,100° C. for 1 to 60 minutes. When the melting temperature is lower than 700° C. or the melting duration is shorter than 1 minute, the composite glass composition is not completely melted, causing unmixing of a glass melt. Conversely, when the melting temperature exceeds 1,100° C. or the melting duration exceeds 60 minutes, it is not economical because excessive energy and time are required.

Cooling

In the cooling (S130), the molten glass composition is cooled to a room temperature.

In the present step, the cooling is preferably performed in a cooling in furnace scheme. When air-cooling or water-cooling is applied, internal stress of the composite glass is severely generated, and thus, cracks are able to occur in some cases. Therefore, the cooling in furnace is preferable for the cooling.

Pulverizing

In the pulverizing (S140), the cooled glass is pulverized. In this regard, it is preferable to use a ball mill for the pulverizing.

By such pulverizing, the glass is finely pulverized to prepare the glass powder. The glass powder preferably has an average diameter equal to or smaller than 30 μm, and an average diameter in a range from 15 to 25 μm may be presented as a more preferable range.

With the above processes (S110 to S140), the glass powder for the eco-friendly detergent according to the embodiment of the present disclosure may be prepared.

When the glass powder for the eco-friendly detergent prepared by the method according to the embodiment of the present disclosure is used as the eco-friendly detergent, the new solution that realizes the excellent washing power equivalent to or greater than that of the commercial detergents may be presented.

In addition, when the glass powder for the eco-friendly detergent prepared by the method according to the embodiment of the present disclosure is used as the eco-friendly detergent, because the surfactant is not added thereto, not only the rinsing process may be shortened, but also the water consumption during the laundry may be reduced.

In addition, when using the glass powder for the eco-friendly detergent prepared by the method according to the embodiment of the present disclosure as the eco-friendly detergent, the laundry efficiency may be increased when the glass powder is used together with the commercial detergent and the elution water, so that the energy saving effect may be achieved.

In addition, when the eco-friendly detergent according to the present disclosure is put into the automatic detergent box of the washing machine, the glass may be homogeneously and constantly eluted, so that the recurring period may be extended and the high reliability may be maintained even in the repeated laundry processes.

Present Examples

Hereinafter, a configuration and an operation of the present disclosure will be described in more detail with a preferred embodiment of the present disclosure. However, this is presented as a preferred example of the present disclosure and is not able to be construed as limiting the present disclosure in any way.

Contents not described herein may be technically inferred by those skilled in the art, so that a description thereof will be omitted.

1. Specimen Preparation

Table 1 shows components of glass compositions and component ratios thereof of specimens according to Present Examples 1 to 7 and Comparative Examples 1 to 6. In this regard, in Present Examples 1 to 4 and Comparative Examples 1 to 3, the components were mixed with each other and stirred based on the compositions shown in Table 1 to form the glass compositions, then the glass compositions were melted in an electric furnace at a temperature of 1,050° C. and then cooled in a form of a glass bulk in the air-cooling scheme on a stainless steel plate to obtain pieces of glass in a form of a cullet. Thereafter, the pieces of glass were pulverized using the ball mill and then passed through a 400 mesh sieve to prepare glass powder specimens for the eco-friendly detergent with a D90 average particle diameter of 20 μm were prepared. In this regard, $Na_2CO_3$ and $K_2CO_3$ were used as raw materials for $Na_2O$ and $K_2O$, respectively, and for the other components except for these, those described in Table 1 were used.

In Present Examples 5 to 7 and Comparative Examples 4 to 6, glass powder specimens for the eco-friendly detergent were prepared in the same manner as in Present Example 1, except that the specimens were melted at a temperature of 980° C.

TABLE 1

(Unit: wt %)

| Division | $SiO_2$ | $B_2O_3$ | $Na_2O$ | $K_2O$ | CaO | MgO |
|---|---|---|---|---|---|---|
| Present Example 1 | 5 | 65 | 10 | 10 | 5 | 5 |
| Present Example 2 | 4 | 70 | 7 | 13 | 2 | 4 |
| Present Example 3 | 2 | 65 | 23 | 3 | 6 | 1 |
| Present Example 4 | 2 | 70 | 10 | 14 | 1 | 3 |
| Present Example 5 | 1 | 80 | 6 | 10 | 3 | 0 |
| Present Example 6 | 9 | 65 | 15 | 2 | 2 | 7 |
| Present Example 7 | 5 | 70 | 11.5 | 11.5 | 1 | 1 |
| Comparative Example 1 | 5 | 65 | 20 | 10 | 0 | 0 |
| Comparative Example 2 | 2 | 70 | 14 | 14 | 0 | 0 |
| Comparative Example 3 | 20 | 50 | 20 | 10 | 0 | 0 |
| Comparative Example 4 | 7 | 60 | 0 | 20 | 6 | 7 |
| Comparative Example 5 | 15 | 55 | 10 | 20 | 0 | 0 |
| Comparative Example 6 | 25 | 50 | 0 | 25 | 0 | 0 |

2. Evaluation of Washing Power

Table 2 shows washing power evaluation results of the specimens according to Present Examples 1 to 7 and Comparative Examples 1 to 6, and Table 3 shows washing power evaluation results of tap water and commercial detergents. In this regard, in Table 3, two types of commercial liquid detergents (a product P of company H and a product T of company L) were used, and were quantitatively added to be used as reference standards to determine the washing power level of the glass elution water.

In this regard, the washing power evaluation was performed using a Terg-O-Tometer.

First, for the preparation of the elution water, 320 g of each glass powder prepared according to each of Present Examples 1 to 7 and Comparative Examples 1 to 6 was continuously immersed in a plastic container containing 600 mL of room temperature water. 120 mL of the elution water was drawn every 6 hours to evaluate the washing power, and at the same time, 120 mL of the tap water was filled in the plastic container to maintain 600 mL of water.

In this regard, washing power for each composition of the glass elution water was reviewed using a total of three soiled fabrics of EMPA fabrics contaminated with red wine and blood and a Jis fabric (a composite soiled fabric). Evaluation of detergent power was performed using the KS M 2709 standard.

After drawing 120 mL from 600 mL of the glass elution water, 6 mL of the drawn glass elution water was put into 1 L of the tap water to perform the laundry for 10 minutes at 30° C. and then the rinsing process was repeated twice with 1 L of the tap water for 3 minutes. In a case of repeated-washing power, 120 mL out of 600 mL of the elution water was drawn, then 6 mL of the drawn elution water was used for the laundry, and then 120 mL of the tap water was filled in an elution container again. Such process was performed a total of 40 times for each composition. In this regard, a time period from a first laundry test to a second laundry was selected to be about 6 hours, and the elution water was drawn homogeneously.

TABLE 2

| Division | Wine (%) | Blood (%) | Jis (%) |
|---|---|---|---|
| Present Example 1 | 47.9 | 56.3 | 33.2 |
| Present Example 2 | 46.0 | 53.4 | 31.0 |
| Present Example 3 | 44.5 | 54.2 | 32.7 |
| Present Example 4 | 44.7 | 48.0 | 31.0 |
| Present Example 5 | 43.8 | 41.3 | 32.0 |
| Present Example 6 | 45.9 | 43.6 | 34.0 |
| Present Example 7 | 46.3 | 43.5 | 34.5 |
| Comparative Example 1 | 43.6 | 57.4 | 31.0 |
| Comparative Example 2 | 49.6 | 51.1 | 32..3 |
| Comparative Example 3 | 35.6 | 26.9 | 10.9 |
| Comparative Example 4 | 31.6 | 46.9 | 21.5 |
| Comparative Example 5 | 38.1 | 30.7 | 10.0 |
| Comparative Example 6 | 37.7 | 30.2 | 6.6 |

TABLE 3

| Reference | Wine (%) | Blood (%) | Jis (%) |
|---|---|---|---|
| Tap water | 39.2 | 25.1 | 10.2 |
| Product P of company H | 49.6 | 30.8 | 37.1 |
| Product T of company L | 40.2 | 27.9 | 30.2 |

As shown in Tables 1 to 3, as may be seen from the washing power evaluation results of Present Examples 1 to 7 and Comparative Examples 1 to 2, it was confirmed that the washing power is excellent with the content of $SiO_2$ in a range from 1 to 9 wt % and the content of $B_2O_3$ in a range from 65 to 80 wt %.

On the other hand, as may be seen in Comparative Examples 3, 5, and 6, it may be seen that the washing power is generally lowered when the content of $SiO_2$ is equal to or greater than 10 wt %. It may be assumed that the elution characteristics are limited as the content of $SiO_2$ increases.

In addition, as may be seen in Comparative Example 4 in which the content of the alkaline earth oxide is equal to or greater than 10 wt %, it may be seen that power for washing the wine is lowered. Therefore, it may be assumed that, when the content of the alkaline earth oxide exceeds 10 wt %, the power for washing the dye component is lowered.

As shown in Tables 2 and 3, it was confirmed that, in the case of Present Examples 1 to 7, the laundry power of the glass elution water was far superior to that of the tap water, and a performance similar to or higher than that of the commercial detergents was achieved.

The above is a very interesting result. The reason is that no case has been reported so far in which the elution water to which the glass is eluted is applied to the washing machine. The above result is expected to greatly contribute to providing the new laundry solution. In addition, the above result may be widely used for the eco-friendly detergent and the like because it shows the washing power at the level of the commercial detergent without the surfactant, which is the main component of the detergent.

3. Evaluation of Washing Continuity

Figure 2:
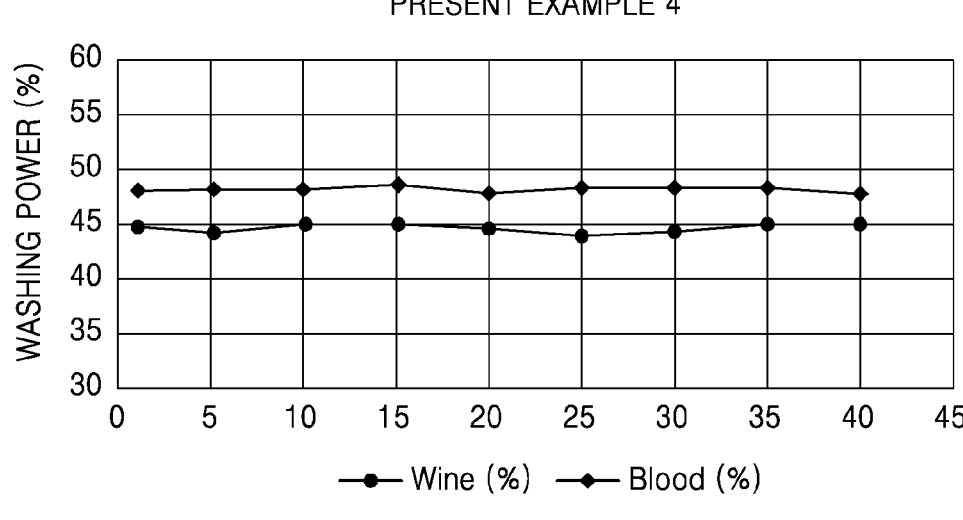
FIG. 2 is a graph showing results of evaluation of washing continuity of a specimen according to Present Example 4.
Figure 3:
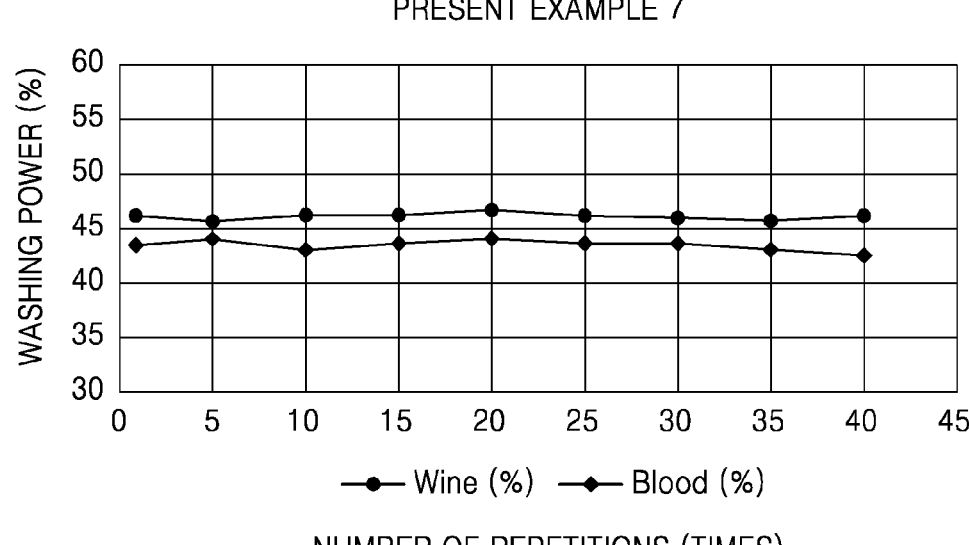
FIG. 3 is a graph showing results of evaluation of washing continuity of a specimen according to Present Example 7.

FIG. 2 is a graph showing results of evaluation of washing continuity of a specimen according to Present Example 4, and FIG. 3 is a graph showing results of evaluation of washing continuity of a specimen according to Present Example 7. In addition, FIG. 4 is a graph showing results of evaluation of washing continuity of a specimen according to Comparative Example 1, and FIG. 5 is a graph showing results of evaluation of washing continuity of a specimen according to Comparative Example 2.

As shown in FIGS. 2 and 3, it may be seen that the washing power is not reduced and maintained constant even after 40 cycles of the repeated elution when the specimens according to Present Examples 4 and 7 are used.

Figure 4:
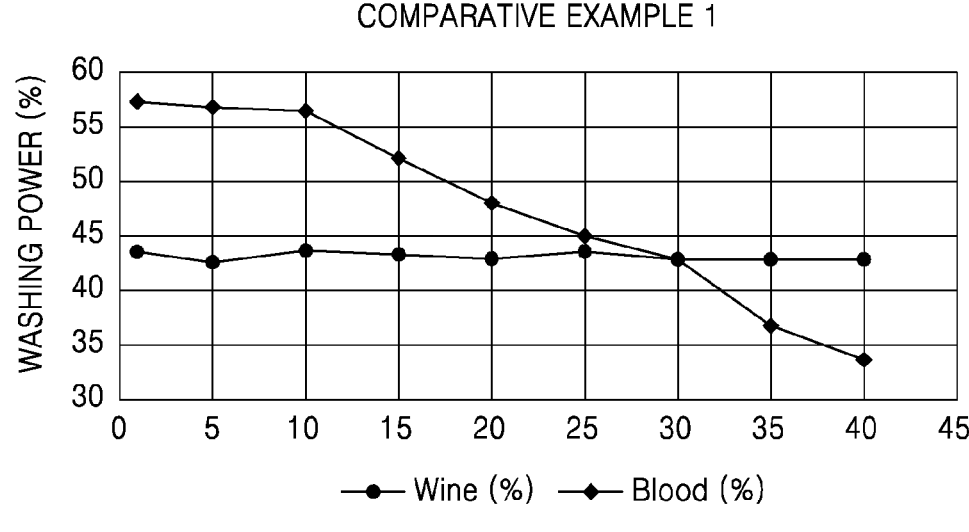
FIG. 4 is a graph showing results of evaluation of washing continuity of a specimen according to Comparative Example 1.
Figure 5:
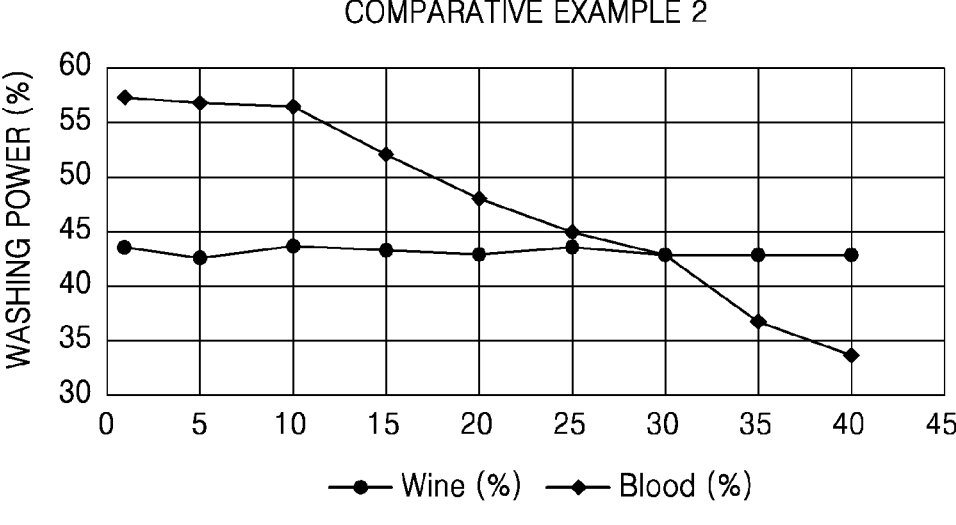
FIG. 5 is a graph showing results of evaluation of washing continuity of a specimen according to Comparative Example 2.

On the other hand, as shown in FIGS. 4 and 5, it may be seen that the power for washing the blood is significantly reduced as the number of repetitions increases when the specimens according to Comparative Examples 1 and 2 are used. This means that the elution of the alkali ions occurred first and the elution of boron (B) occurred slowly than that of the alkali ions. That is, it means that the homogeneity of the elution is not ensured.

In contrast, it may be seen that Present Examples 4 and 7 containing the alkaline earth oxides (CaO and MgO) exhibit homogeneous washing ability up to a 40th cycle of the elution. This is expected to be because the alkaline earth components (CaO and MgO) affected the structure of the glass and increased the homogeneity and the continuity of the elution.

The evaluation results of the washing continuity above are expected to be very meaningful, because it indicates that 40 times or more of the washing is possible when 320 g of the glass powder is applied to the actual washing machine. In other words, it means that the glass powder may be applied to the washing machine in the form of the detergent input to the automatic detergent box.

As described above, the present disclosure has been described with reference to the drawings illustrated, but the present disclosure is not limited by the embodiments disclosed herein and drawings, and it is obvious that various modifications may be made by those skilled in the art within the scope of the technical idea of the present disclosure. In addition, although the operational effects based on the configuration of the present disclosure have not been explicitly described while describing the embodiments of the present disclosure, it is obvious that the effects predictable by the corresponding configuration should also be acknowledged.

REFERENCE NUMERALS

S110: MIXING
S120: MELTING
S130: COOLING
S140: PULVERIZING

What is claimed is:

1. A glass composition for detergent, the glass composition comprising:
 from 60 to 85 wt % of $B_2O_3$;
 from 1 to 10 wt % of $SiO_2$;
 from 15 to 30 wt % of $K_2O$ and $Na_2O$; and
 from 1 to 10 wt % of at least one of CaO and MgO.

2. The glass composition of claim 1, wherein an amount of the $B_2O_3$ is within a range from 65 to 80 wt %.

3. The glass composition of claim 1, wherein an amount of the $SiO_2$ is within a range from 2 to 9 wt %.

4. The glass composition of claim 3, wherein the amount of the $SiO_2$ is within a range from 4 to 6 wt %.

5. The glass composition of claim 1, wherein amounts of the $K_2O$, the $Na_2O$, the CaO, and the MgO satisfy a following Formula 1, $$([K_2O]+[Na_2O])/([CaO]+[MgO]) \geq 2 \qquad \text{Formula 1:}$$

(where, [ ] represents a weight ratio of the corresponding component).

6. The glass composition of claim 1, wherein amounts of the CaO, the MgO, the $K_2O$, the $Na_2O$, the $B_2O_3$, and $SiO_2$ satisfy a following Formula 2, $$([CaO]+[MgO]+[K_2O]+[Na_2O])/[B_2O_3] \text{ and } [SiO_2]) \geq 0.33 \qquad \text{Formula 2:}$$

(where, [ ] represents a weight ratio of the corresponding component).

7. A method for preparing glass powder for detergent, the method comprising:
 forming a glass composition by mixing a combination that includes from 60 to 85 wt % of $B_2O_3$, from 1 to 10 wt % of $SiO_2$, from 15 to 30 wt % of $K_2O$ and $Na_2O$, and from 1 to 10 wt % of at least one of CaO and MgO;
 melting the glass composition;
 cooling the melted glass composition; and
 pulverizing the cooled melted glass composition.

8. The method of claim 7, wherein an amount of the $B_2O_3$ is within a range from 65 to 80 wt %.

9. The method of claim 7, wherein an amount of the $SiO_2$ is within a range from 2 to 9 wt %.

10. The method of claim 9, wherein the amount of the $SiO_2$ is within a range from 4 to 6 wt %.

11. The method of claim 7, wherein amounts of the $K_2O$, the $Na_2O$, the CaO, and the MgO satisfy a following Formula 1, $$([K_2O]+[Na_2O])/([CaO]+[MgO]) \geq 2 \qquad \text{Formula 1:}$$

(where, [ ] represents a weight ratio of the corresponding component).

12. The method of claim 7, wherein amounts of the CaO, the MgO, the $K_2O$, the $Na_2O$, the $B_2O_3$, and $SiO_2$ satisfy a following Formula 2, $$([CaO]+[MgO]+[K_2O]+[Na_2O])/[B_2O_3] \text{ and } [SiO_2]) \geq 0.33 \qquad \text{Formula 2:}$$

(where, [ ] represents a weight ratio of the corresponding component).

13. The method of claim 7, wherein the melting of the glass composition includes melting the glass composition at a temperature within a range from 700 to 1,100° C. for 1 to 60 minutes.

14. The method of claim 7, wherein the pulverized cooled melted glass composition forms pulverized glass powder having an average diameter equal to or smaller than 30 μm.

15. A method for preparing glass powder, the method comprising:

forming a glass composition that includes from 60 to 85 wt % of $B_2O_3$, from 1 to 10 wt % of $SiO_2$, from 15 to 30 wt % of $K_2O$ and $Na_2O$, and from 1 to 10 wt % of at least one of CaO and MgO; and melting the glass composition at a temperature within a range from 700 to 1,100° C.

16. The method of claim 15, comprising:

cooling the melted glass composition in a furnace to form cooled glass.

17. The method of claim 16, comprising:

pulverizing the cooled glass to form the glass powder.

18. The method of claim 17, wherein the glass powder has an average diameter equal to or smaller than 30 μm.

19. The method of claim 15, wherein the glass composition includes an amount of the $B_2O_3$ within a range from 65 to 80 wt %.

20. The method of claim 15, wherein the glass composition includes amounts of the $K_2O$, the $Na_2O$, the CaO, and the MgO that satisfy a following Formula 1, $$([K_2O]+[Na_2O])/([CaO]+[MgO]) \geq 2 \qquad \text{Formula 1:}$$

(where, [ ] represents a weight ratio of the corresponding component).

\* \* \* \* \*